July 25, 1933.  E. E. HEWITT  1,919,430
DOUBLE CHECK VALVE DEVICE
Filed Aug. 13, 1929
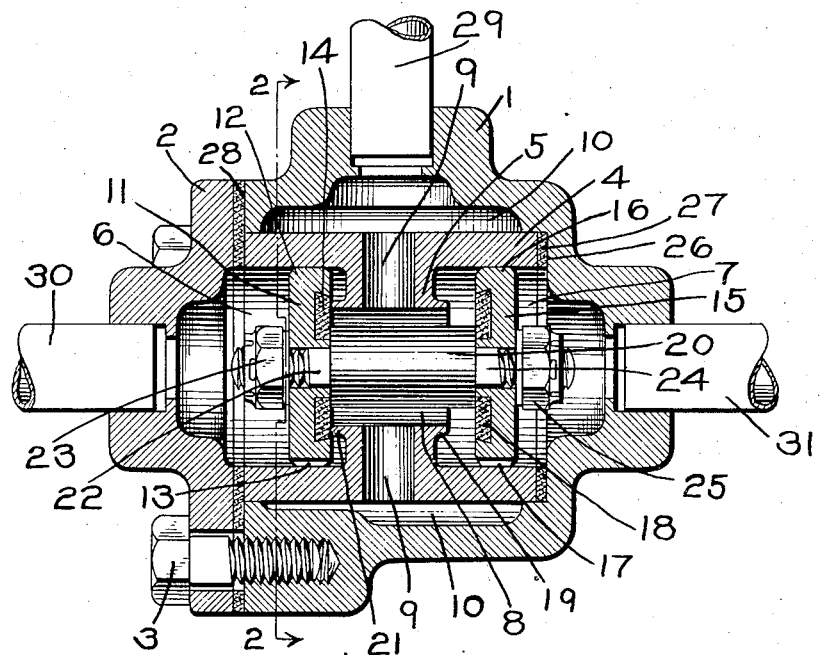
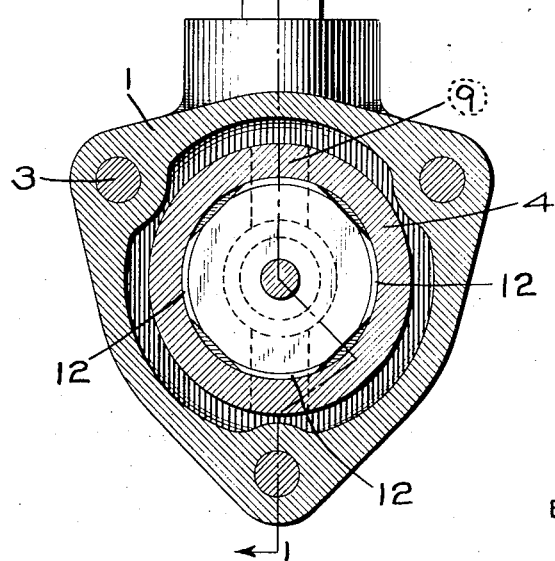
INVENTOR
ELLIS E. HEWITT
BY Wm. M. Cady
ATTORNEY Patented July 25, 1933

1,919,430

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOUBLE CHECK VALVE DEVICE

Application filed August 13, 1929. Serial No. 385,528.

This invention relates to fluid pressure actuated valve devices and more particularly to a double check valve device adapted to control the flow of fluid under pressure between either one of two separate pipes and a third pipe.

The principal object of my invention is to provide an improved valve device of the above character.

In the accompanying drawing; Figure 1 is a sectional view of a double check valve device constructed in accordance with my invention; and Fig. 2 is a sectional view taken on the line 2—2 of Fig. 1.

As shown in the drawing, the double check valve device comprises a casing having a hollow body portion 1 and a cover plate 2 secured to one end of the body portion by a plurality of screws 3.

Removably mounted in the body portion 1 is a valve assembly comprising a cage 4 having a transversely disposed wall 5, which forms chambers 6 and 7. These chambers are connected by a bore 8 through the wall 5. The bore 8 is connected by means of a plurality of passages 9 with a cavity 10, which surrounds the cage 4.

Contained in chamber 6 is a valve 11 provided with a plurality of projections 12, which engage the wall of said chamber and guide the valve. Between said projections are passages 13 through which communication is established from one side of the valve to the opposite side thereof.

The valve 11 is provided on one side with a recess containing a seal 14, which is adapted to engage a seat rib 21, formed concentric with the bore 8 in wall 5, so as to effect a leak proof seal between chamber 6 and bore 8.

Contained in chamber 7 is a valve 15, which may be similar in construction to valve 11. The valve 15 is provided with a plurality of projections 16, which engage the wall of chamber 7 and guide the valve. Between the projections 16 are passages 17 through which communication is established from one side of the valve to the other side thereof.

The valve 15 is provided on one side with a recess containing a seal 18, which is adapted to engage a seat rib 19 formed concentric with the bore 8 in wall 5, so as to effect a leak proof seal between chamber 7 and bore 8.

The valves 11 and 15 are connected together by a stem 20 having an enlarged central portion engaging the seal 14 in valve 11 and the seal 18 in valve 15, so as to position said valves relative to each other and to hold said seals in their respective valves. The stem 20 has at one side an extension 22 of smaller diameter, which extension projects through a bore in valve 11 and is provided with a nut 23 at its outer end, said nut having screw-threaded engagement on said extension to hold the valve against stem 20. Likewise, an extension 24 at the opposite end of stem 20 extends through a central bore in valve 15 and a nut 25 is provided thereon to hold said valve in engagement with stem 20.

Interposed between the right end of the cage 4 and a shoulder 26 in the body portion 1 is a compressible gasket 27, while interposed between the lift end of the cage 4 and cover plate 2, and the cover plate and body portion 1 is a compressible gasket 28, said gaskets being compressed when the device is assembled and the screws 3 are in the tightened position, as shown in the drawing. By these means, a leak proof seal is effected between chamber 6 and chamber 10, and chamber 7 and chamber 10.

A pipe 29 is connected to chamber 10 and in operation, the connected valves 11 and 15 are adapted at one time to allow a communication between a pipe 30 connected to chamber 6 and the pipe 29, and at another time said valves are adapted to allow a communication between a pipe 31, connected to chamber 7, and the pipe 29, as will now be explained.

In order to connect pipe 31 to pipe 29, fluid under pressure may be supplied to valve chamber 6 through pipe 30, and with pipe 31 and valve chamber 7 at substantially atmospheric pressure, the pressure of fluid in valve chamber 6, acting on the left side of valve 11, shifts said valve into engagement with seat rib 21, thereby closing communication between chamber 6 and bore 8, and atthe same time shifts the valve 15 to the position shown in the drawing, in which communication is established between pipe 31 and pipe 29 by way of valve chamber 7, bore 8, passages 9 and chamber 10. In like manner, fluid under pressure supplied to valve chamber 7, when the pressure in valve chamber 6 is substantially at atmospheric pressure, shifts the valve 15 into engagement with seat rib 19 in order to close communication between chamber 7 and bore 8, and also shifts valve 11 away from seat rib 21, so as to establish communication between pipe 30 and pipe 29 by way of chamber 6, passages 13 around valve 11, bore 8, passages 9 and chamber 10.

One particular feature of my invention is that the valve assembly, comprising the cage 4 and the contained valves is readily removable from the casing by taking out the screws 3 and removing the cover plate 2 from the body portion 1. This simplifies replacement of broken or worn parts and effects easier assembling of the valves in the cage. Furthermore, in such a construction only one cover plate is required, whereas if the cage 4 were in the form of a bushing pressed into the body portion, then a cover plate in the right side of the body portion would also be required, since the valves would have to be initially separated from each other and then one removed through the left side of the body and the other removed through the right side of the body.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A double check valve device for controlling communication through a plurality of pipes, said check valve device comprising a casing having a body portion open at one side, a cover plate to close the opening in said body portion, a valve cage having a sliding fit in said casing, means for effecting a leak-proof seal between one end of said cage and the body portion and the other end of said cage and said cover plate, and valves operatively connected within said cage, said valves being insertable into or removable from said body portion only with said cage when said cover plate is removed.

2. A double check valve device for controlling communication through a plurality of pipes, said check valve device comprising a hollow casing open at one end, a bushing removably mounted in said casing and forming an annular chamber between said bushing and casing, a cover plate for closing the open end of said casing, valves operatively mounted in said bushing and having a chamber at opposite sides, means interposed between one end of said bushing and the casing and the other end of said bushing and said cover plate for effecting a leak proof seal between each of the last mentioned chambers and said annular chamber and a pipe connected to each of said chambers.

3. A double check valve device comprising a casing, a valve cage removably mounted in said casing, the wall of said cage being spaced from the wall of said casing to provide an annular chamber which surrounds the valve cage, a pipe connected to said annular chamber, a wall dividing the cage into two valve chambers, a pipe connected to each of said valve chambers, seat ribs formed on the opposite sides of said wall, a bore formed through said wall concentric with said seat ribs, openings connecting said annular chamber and said bore, and a valve in each valve chamber, said valves being connected to operate together, so that when one valve is seated, the other valve is unseated.

4. A double check valve device, for controlling communication through a plurality of pipes, comprising a casing having a hollow body portion open at one end, a cover plate to close the open end of said body portion, a valve assembly comprising a cage having a loose fit in said body portion, two oppositely disposed seat ribs within said cage, two connected valves within said cage adapted to engage said seat ribs, and means interposed between one end of said cage and the body portion of the casing and the other end of said cage and said cover plate for effecting a leak-proof seal.

ELLIS E. HEWITT.